United States Patent [19]
Ferguson et al.

[11] Patent Number: 5,909,440
[45] Date of Patent: Jun. 1, 1999

[54] HIGH SPEED VARIABLE LENGTH BEST MATCH LOOK-UP IN A SWITCHING DEVICE

[75] Inventors: Dennis C. Ferguson; Pradeep S. Sindhu, both of Mountain View; Rajiv N. Patel, San Jose, all of Calif.

[73] Assignee: Juniper Networks, Santa Clara, Calif.

[21] Appl. No.: 08/767,576

[22] Filed: Dec. 16, 1996

[51] Int. Cl.[6] .................................................... H04J 3/24
[52] U.S. Cl. ........................................... 370/389; 370/408
[58] Field of Search ................................... 370/389, 401, 370/402, 407, 412, 413, 414, 415, 416, 417, 428, 429, 395, 241, 245, 251, 248, 254, 256, 351, 355, 360, 362, 382, 406, 408, 409; 395/280, 844, 873, 917, 909; 364/238, 240, 221; 340/825.01, 825.03

[56] References Cited

U.S. PATENT DOCUMENTS

| | | | |
|---|---|---|---|
| 5,130,983 | 7/1992 | Heffner | 340/825.08 |
| 5,384,568 | 1/1995 | Grinberg et al. | 341/51 |
| 5,448,702 | 9/1995 | Garcia, Jr. et al. | 395/325 |
| 5,491,694 | 2/1996 | Oliver et al. | 370/85.4 |

*Primary Examiner*—Dang Ton
*Attorney, Agent, or Firm*—Fish & Richardson P.C.

[57] ABSTRACT

A method and apparatus for looking up a key associated with a packet to determine a route through a routing device, the method including, upon receipt of a key, forward traversing one or more nodes which make up a trie stored in a memory by evaluating at each node traversed a bit in the key as indicated by a bit-to-test indicator associated with each node. A value of the bit in the key determining the path traversed along the trie. The method includes locating an end node having a route and comparing the route to the key. If they match, destination information associated with the end node is outputted to guide the transfer of the packet through the routing device. If they do not match, the trie is traversed backwards to locate a best match for the key.

29 Claims, 15 Drawing Sheets

Figure 4B                    Figure 4C

HIGH SPEED VARIABLE LENGTH BEST
MATCH LOOK-UP IN A SWITCHING
DEVICE

BACKGROUND

The present invention relates generally to data routing systems, and more particularly to a method and apparatus for routing packets through a high speed data switch.

In packet switched communication systems, a router (switch or packet forwarding engine) is a switching device which receives packets on one port, and based on destination information contained within the packet, routes the packet to the destination (or intermediary destination) via another port. Prior art routers perform this routing function by evaluating header information associated with a first data block in the packet in order to determine the proper output port for a particular packet. The evaluation process involves two basic steps performed sequentially: key extraction and route look-up.

Each packet contains a header and data field. The header field contains control information associated with the routing of the packet, including source and destination information. The data field contains information which may include embedded headers for higher level protocols. The first step of the routing process is the identification of the key. The key contains the information that is used to look-up the route for an incoming packet. Upon identifying the key associated with an incoming packet, the router next must determine which port provides the best path to the destination.

Associated with the router is a route table. The route table includes entries having a route and destination associated therewith. After a key for a packet has been determined, the router performs a look-up in the route table for the destination associated with that key to determine the output port for the packet. The key may match multiple routes in the route table. Assuming the router located a match of the key in the route table, the entire packet is thereafter routed to the destination via the indicated output port.

In the prior art, the process of performing the look-up in a large route table was a very time consuming process. In order to speed the look-up process, caching of the most recent route matches was often performed. However, caching is minimally effective, providing an advantage only if the same key patterns are repeated.

In addition, the process of changing a route in an existing route table was difficult in prior art systems, often requiring the disruption of the look-up process.

Finally, prior art route tables typically provide only route and destination information. The size of the route tables were often minimized to include only minimal information for route look-up. Typically, separate tables were required for unicast and multicast routing. Pejorative information relating to flow identification, packet routing or accounting was not stored in the route tables so as not to slow down the already under-performing look-up engines.

SUMMARY OF THE INVENTION

In general, in one aspect, the invention provides a method of looking up a key associated with a packet to determine a route through a routing device including upon receipt of a key, forward traversing one or more nodes which make up a trie stored in a memory by evaluating at each node traversed a bit in the key as indicated by a bit-to-test indicator associated with each node. A value of the bit in the key determining the path traversed along the trie. The method includes locating an end node having a route and comparing the route to the key. If they match, destination information associated with the end node is outputted to guide the transfer of the packet through the routing device. If they do not match, the trie is traversed backwards to locate a best match for the key.

Preferred embodiments include he following features. Forward traversing includes storing on a stack for each node having an attached route the bit-to-test indicator and a pointer to the attached route.

Traversing the trie backwards includes comparing the key with the route to determine a first dissimilar bit location, popping entries off the stack to determine when the bit-to-test indicator associated with a first node in the backward traversal is less than or equal to the first dissimilar bit location, and outputting destination information associated with the first node to guide the transfer of the packet through the routing device.

The first node includes a route and statistical information for each packet is calculated and stored in memory with the route for the end node and the first node. The statistical information is transferred along with the destination information to an output port in the routing device for transfer to a destination.

Prior to a forward traversal of the trie, a root table is searched for a match of a predetermined number of bits in the key where the root table is indexed by the predetermined number of bits and each entry includes a pointer to a start node in the trie to begin the forward traversal.

The forward traversal of the trie includes loading node information for each node traversed in the trie until the end node is reached, the node information including a bit-to-test indicator, a left child pointer, a right child pointer and an attached route. The nodes in the trie include left child pointers and right child pointers with each pointer including a bit-to-test indicator for indicating a bit to be tested in the key associated with a child node to which the left or right child pointer indicates. Memory accesses are minimized in the forward traversal of the trie by requiring the loading of a single pointer at each node until the end node.

In another aspect, the invention provides a method of routing a packet through a switch including upon receipt of a packet, extracting a key from the packet. Thereafter a trie is forward traversed by evaluating at each node a bit in the key as indicated by a bit-to-test indicator associated with each node. A value of the bit in the key located at a position indicated by the bit-to-test indicator determining the path traversed along the trie at each node. Thereafter, an end node having a route is located. The route is compared to the key. If they match, destination information associated with the end node is retrieved. If they do not match, the trie is traversed backwards to locate a best match for the key having a route and destination information associated therewith. The packet is routed through the switch according to the destination information.

Preferred embodiments of the invention include the following features. Statistical information associated with each route is calculated and stored in memory with an associated route. The statistical information is forwarded along with the packet to a destination. The statistical information includes transaction statistics associated with numbers or types of packets routed to a particular destination or billing information.

Quality of service information is assigned to each route. The quality of service information determining a priority of a transfer of the packet out of the routing device.

In another aspect the invention provides a method of inserting a route in a route table where the route table is stored as a trie in a memory of a routing device. The route table defining the path by which a packet is transferred through the routing device. The method includes traversing a trie to determine an insertion point, creating a new node, and determining if the insertion point for the new node is between existing nodes in the trie. If so, a child pointer is set in the new node to indicate a node directly beneath the insertion point. The new node is stored in memory. Thereafter, a child pointer in a node directly above the insertion point is updated to indicate a starting address in memory for the new node.

In another aspect the invention provides a router for routing packets in a packet switched network including one or more input ports for receiving packets, a packet memory, an input switch coupled to each input port and the memory. The input switch including a transfer engine for transferring packets from an input port to the packet memory and a key extraction engine for extracting a key from each packet. The router further including a controller coupled to the input switch. The controller including a key look-up engine and a route memory. The route memory for storing a route table where the route table includes a trie. The key look-up engine traversing the trie to determine a best match to the key. Upon determining the best match for the key the controller generates notification information. The router further including one or more output ports, an output switch coupled to the controller, the packet memory and the output port for transferring packets from packet memory to an appropriate output port based on the notification information received from the controller.

Preferred embodiments include the following features. The key look-up engine forward traverses the trie by evaluating at each node traversed a bit in the key as indicated by a bit-to-test indicator associated with each node. A value of the bit in the key determining the path traversed along the trie.

The route memory is divided into a plurality of banks, and where parent and children nodes in the trie are stored in different banks.

Each node in the trie includes a bit-to-test indicator, a left child pointer, a right child pointer and an attached route. The left child pointer indicating a child node to be traversed in the forward traversal when a value of a bit in the key as indicated by the bit-to-test indicator is a first value. The right child pointer indicating a child node to be traversed in the forward traversal when a value of a bit in the key indicated by the bit-to-test indicator is a second value. The left child pointer, right child pointer and attached route are stored in contiguous locations in the route memory.

In another aspect the invention provides a route look-up engine for locating a best match for a key in a route table. The route table including a trie stored in a memory associated with a routing device. The trie including one or more entries defining a path through a routing device for transferring a packet in a packet switched network from a source to a destination. The route look-up engine including a stack for storing stack entries including a bit-to-test indicator and a pointer to a destination and a look-up engine including a buffer, a bit comparison engine and a key comparison engine. The buffer for storing node information that is retrieved from the memory. The node information including a bit-to-test indicator.

In another aspect the invention provides a trie for storing routes in a routing device to allow for efficient routing of packets through the routing device including a start node including a bit-to-test indicator, a left child pointer, a right child pointer and an attached route. The left and right child pointers pointing to internal nodes. The trie includes an internal node including a bit-to-test indicator, a right child pointer, a left child pointer and an attached route. The left and right child pointers pointing to a route node or another internal node. The trie including a route node having a bit-to-test indicator and an attached route.

Preferred embodiments include the following features. The attached route includes statistical and quality of service information.

In another aspect the invention provides a computer program, tangibly stored on a computer-readable medium, comprising instructions for causing a computer to, upon receipt of a key, forward traverse a trie stored in a memory by evaluating at each node traversed a bit in the key as indicated by a bit-to-test indicator associated with each node. A value of the bit in the key determining the path traversed along the trie. The computer caused to locate an end node in the trie having a route and compare the route to the key. If they match, destination information associated with the end node is outputted to guide a transfer of a packet through a routing device. If they do not match, the trie is traversed backwards to locate a best match for the key and destination information associated therewith.

One advantage of the invention is that routes may be simply added to existing route tables without requiring the disruption of the look-up process.

Another advantage of the invention is that additional information including that needed for multicast and flow identification (ID) may be stored in a single route table without affecting the performance of the look-up. The present invention provides a single unified mechanism for performing efficient best-match look-up for unicast, multicast and flow based routing in the presence of extremely large route tables.

Another advantage of the present invention is that line rate route look-ups may be performed on the whole route table without requiring route caching.

Another advantage of the present invention is that large route tables may be efficiently searched at line rates.

Other advantages and features will be apparent from the following description and claims.

BRIEF DESCRIPTION OF THE DRAWINGS

FIG. 4b is a schematic block diagram of a data structure for a start node according to one embodiment of the present invention.

FIG. 4c is a schematic block diagram of a data structure for a route node according to one embodiment of the present invention.

FIG. 72b is a schematic block diagram of a data structure for a internal node with an attached route according to an alternative embodiment of the present invention.

DETAILED DESCRIPTION

Figure 1:
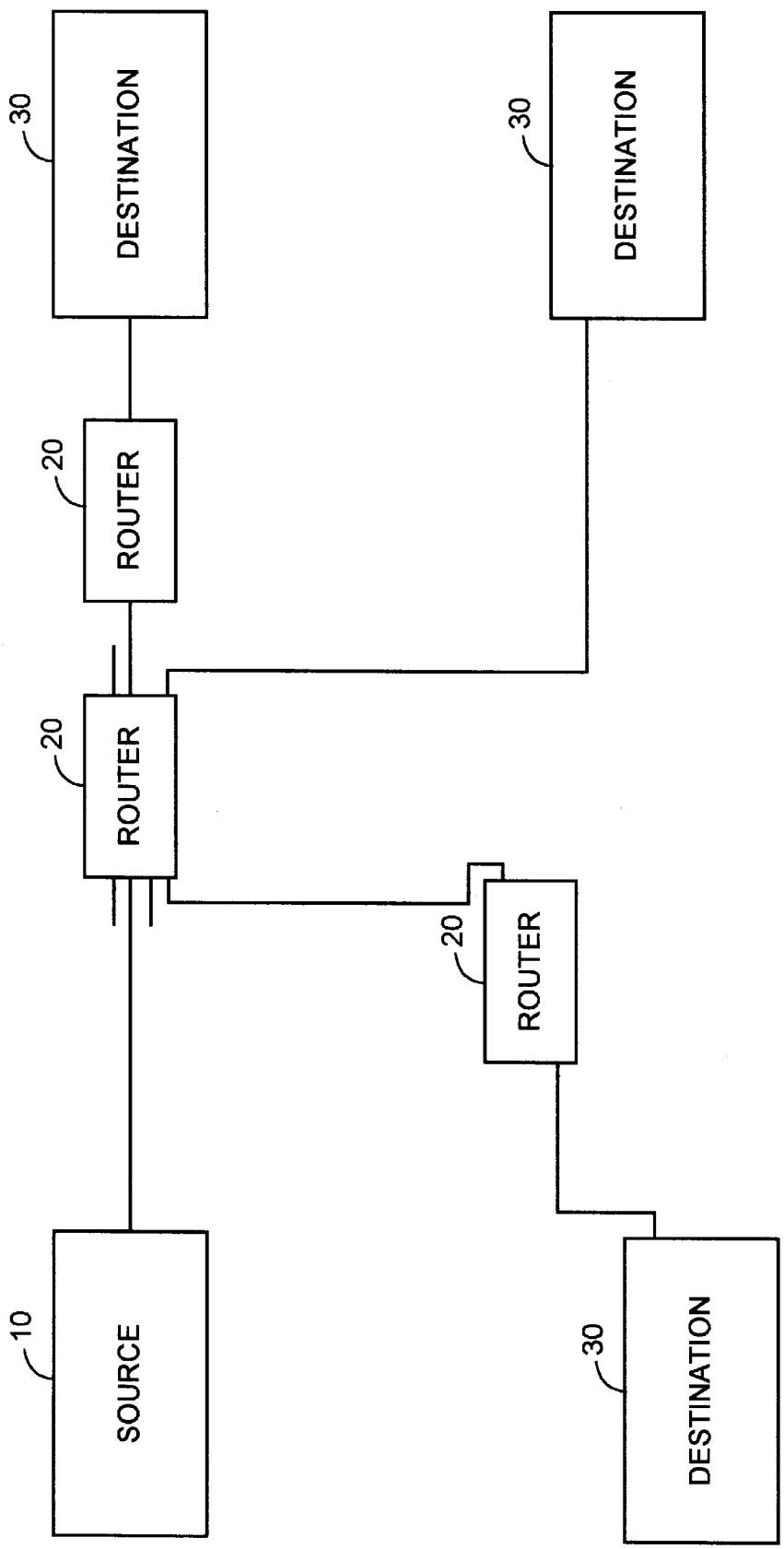
FIG. 1 is a schematic block diagram of a packet switching system according to one embodiment of the present invention.

Referring to FIG. 1, in a packet switched network, a source 10 is connected to one or more routers 20 for transmitting packets to one or more destinations 30. Each router includes a plurality of ports that are connected to various sources and destinations. Accordingly, a packet from source 10 may pass through more than one router 20 prior to arriving at its destination.

Figure 2:
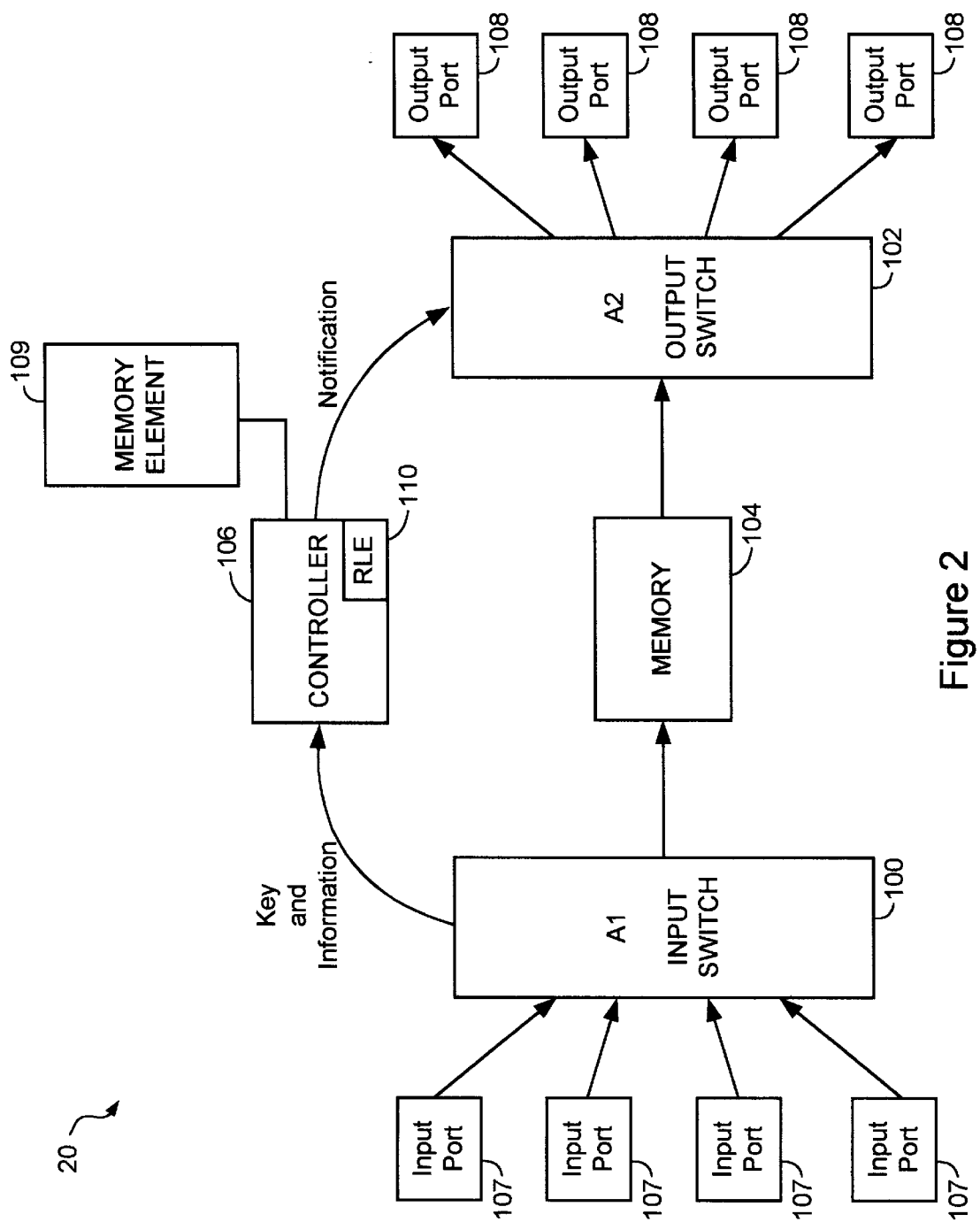
FIG. 2 is a schematic block diagram of a router according to one embodiment of the present invention.

Referring to FIG. 2, each router 20 includes an input switch 100, an output switch 102, a memory 104, a controller 106 and a plurality of input ports 107 and output ports 108. Associated with the controller 106 is a memory element 109 for storing controller data. Each switch 100 and 102 is connected to each input and output port 107 and 108 respectively in router 20. In one embodiment, router 20 includes eight input and output ports 107 and 108, respectively. In this embodiment, the number of input ports and output ports is equal, however, other applications may necessitate greater numbers of one or the other.

Associated with the controller 106 is a route look-up engine 110. In one embodiment of the present invention a plurality of route look-up engines 110 are included in controller 106, each receiving look-up requests in round-robin fashion so as to speed the routing process. In one embodiment, controller memory 109 is a four bank static random access memory (SRAM) that requires thirty two route look-up engines 110 to service at full bandwidth.

The present invention is scalable with respect to performance. That is, the number of route look-up engines 110 included within the controller may be increased to provide higher performance without requiring an increase in memory size. In one embodiment, the number of route look-up engines is eight times as great as the number of memory banks in controller memory 109. Alternatively, lesser cost and performance units may use lesser numbers of route look-up engines 110.

In operation, packets are received at an input port 107, transferred to input switch 100 and stored temporarily in memory 104. When the packet is received by switch 100, a key extraction engine reads the key from the first data block in the packet and transfers the key to controller 106. The input switch also includes a transfer engine for transferring packets received from an input port 107 to memory 104.

The key includes at least destination information and may also include source information, a flow identifier and physical source information (input port ID). The key is located in the header field associated with the first block of data in a packet. The header may contain other information (ISO layer 2 and layer 3 headers), such information is passed to memory for storage. The process of reading key information from a packet is known in the art. The present invention accommodates keys of various types. For example, keys for various protocols may be designated (IPV4, IPV6, etc.). The length of the key is user definable. In general, the key is derived from the header, but portions may also be derived from the payload (data field associated with the packet).

When the controller receives the key information, it must determine a key type. In one embodiment of the present invention, a plurality of key types are defined. The user may define up to 4 types of keys, each having variable length. In one embodiment, the key type is defined by a two bit field in the header. A look-up of the two bit field is used to determine the appropriate trie to search.

Thereafter, route look-up engine 110 performs a trie based search for the best variable length match of the key, with each key type defining a particular trie for searching. A trie is a data structure that is used to locate the best (longest) matching route for a given key. The process of the trie based search will be described in greater detail below in reference to FIG. 6. At the completion of the trie search, the route look-up engine returns a result which includes the output port associated with the destination.

The result and other information (source ID, flow ID, packet length, quality of service and statistical information) for routing the packet through the router combine to form a notification. The notification is transferred from the controller 106 to the output switch 102. Upon receiving the notification, the output switch 102 initiates the transfer of the packet from memory 104 to the respective output port 108 associated with the result.

Figure 3:
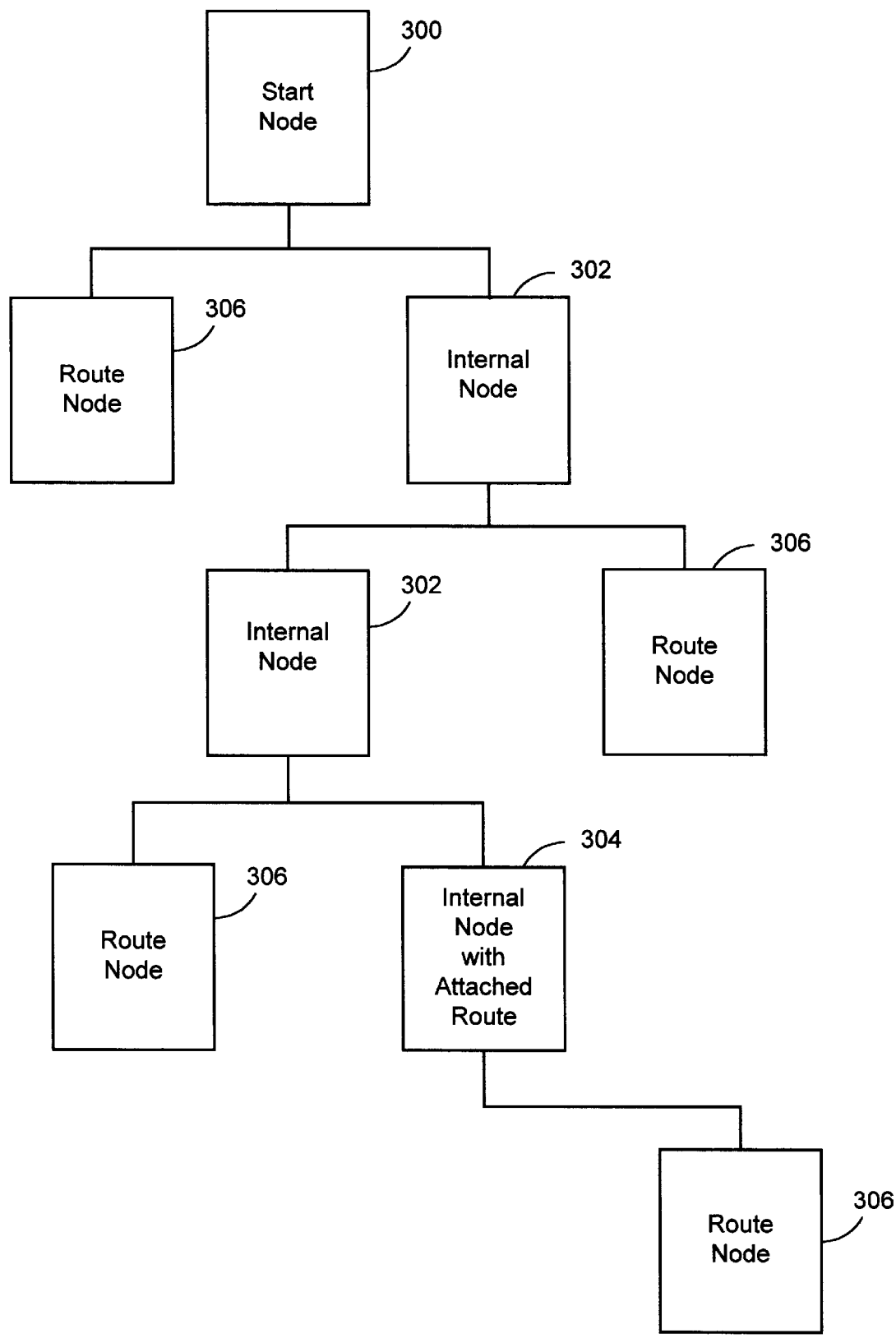
FIG. 3 is a schematic block diagram of a route trie according to one embodiment of the present invention.

Route look-up engine 110 performs the best match variable length look-up based on a modified radix trie search routine. Specifically, in one embodiment of the invention, a route table is stored in memory 109 in the form of one or more tries. Each trie is comprised of one or more nodes including a start node 300, and may include internal nodes (without an attached route) 302, internal nodes with an attached route 304 and route nodes 306 as is shown in FIG. 3. In one embodiment, the starting node includes an attached route that is guaranteed to match any key having a type associated with this particular trie. In this way, the attached route provides a default path in the event no other match is located in the trie for a particular key.

Nodes are the decision points in the look-up process. A key associated with a packet has various ones of its bits tested at nodes along the trie, and depending on the value of the indicated bit in the key being tested, will result in the traversal down a particular branch of the trie. The bits of a key are numbered left to right. Associated with each node is a bit-to-test indicator. The value of the bit-to-test indicator in a trie branch increases until a leaf (route node) is reached. Internal nodes may be of two types, those with and those without attached routes. An internal node with an attached route 304, may be a match for a key. Internal nodes without attached routes are never a match for a key. Route nodes 306 are nodes which have no children and, accordingly, only contain route information. The traversal along the trie will be described in greater detail below in reference to FIG. 6.

Figure 4A:
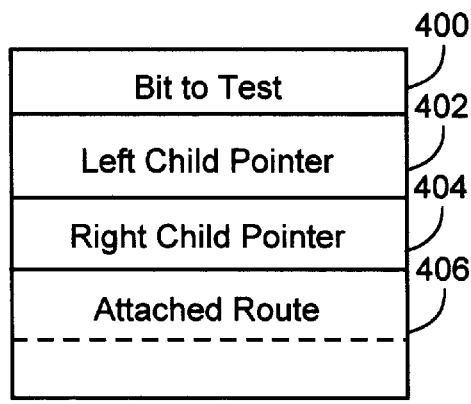
FIG. 4a is a schematic block diagram of a data structure for an internal node with an attached route according to one embodiment of the present invention.

The data structure for each internal node in a trie according to one embodiment of the present invention is shown in FIG. 4a. Associated with each node is a bit-to-test indicator field 400, a left child pointer 402, a right child pointer 404 and an attached route 406. The bit-to-test indicator field indicates the bit in the key which is to be tested at this node in order to determine which branch (left child or right child) in the trie should be traversed in the look-up process. The left child pointer 402 points to a left child in the trie structure while the right child pointer 404 points to a right child in the trie structure. A left child is the next node in the trie to be traversed when the bit tested for the present node has a value of 0. Conversely the right child is the next node in the trie to traverse when the bit tested associated with the present node has a value of 1.

The attached route 406 indicates a result which is associated with this particular node. In one embodiment, the attached route is two words and includes both output port and prefix information. Alternatively, the attached route may also include other data such as quality of service and statistical information. In one embodiment, the attached route includes fields associated with the route (destination) which are updated each time a packet is processed for the given route. The information is stored along with the attached route and may be downloaded in response to a query from a user or the destination. Alternatively, a portion or all of the information may be downloaded with each packet transferred to a destination as part of the notification. Often it is desirable to attach information to a route that indicates statistical information associated with a given route (destination). Examples of statistical information that may be transferred to a destination include number of packets (in a given time period), frequency of packets, average size of packets, and time since the last packet. Other statistical information including accounting information may also be stored with the attached route and may be incorporated into the notification. For example, billing information for a particular transfer or cumulative billing information may also be incorporated into the notification. In one embodiment of the present invention, controller 106 (FIG. 2) includes statistical modules for calculating statistical information related to each packet transferred through the router. As each packet is processed by the controller, statistical modules update the statistical information stored with the destination route determined in the look-up process.

In addition, quality of service information may be stored with an attached route to speed the routing of certain packets through the switch structure. A quality of service value may be set for each route to allow for the prioritization of packets transferred out a particular output port.

In one embodiment, the data structure of an attached route is comprised of a prefix length, a prefix (the portion that is left justified and matched against the key), a result field, a statistics field and a quality of service field. Prefix length indicates the length of the prefix in bits. The prefix is a pattern (portion of a key) that is compared against a key to determine a best match. The result field stores the output port (destination port) associated with the particular route (prefix). In the event that the prefix associated with a particular node is itself the best match for a given key, then the attached route indicates the output port to which the packet is to be routed. In one embodiment of the present invention, the attached route is a pointer which points to the location in memory where the attached route is stored. Alternatively, the attached route may be stored in consecutive memory locations with the rest of the node information as described above.

The data structure for the start node according to one embodiment of the present invention is shown in FIG. 4*b*. Associated with the start node are a left child pointer 402, a right child pointer 404 and an attached route 406. In one embodiment of the present invention, no bit-to-test indicator field is stored in memory for the start node. This is because, typically the bit-to-test indicator for the start node is set to bit zero. Alternatively, another bit in the key may be the first bit-to-test. If another bit is the first bit-to-test, then the associated bit identifier is stored in a bit-to-test indicator field for the start node.

The data structure for each route node according to one embodiment of the present invention is shown in FIG. 4*c*. Each route node has only an attached route 406.

Figure 4D:
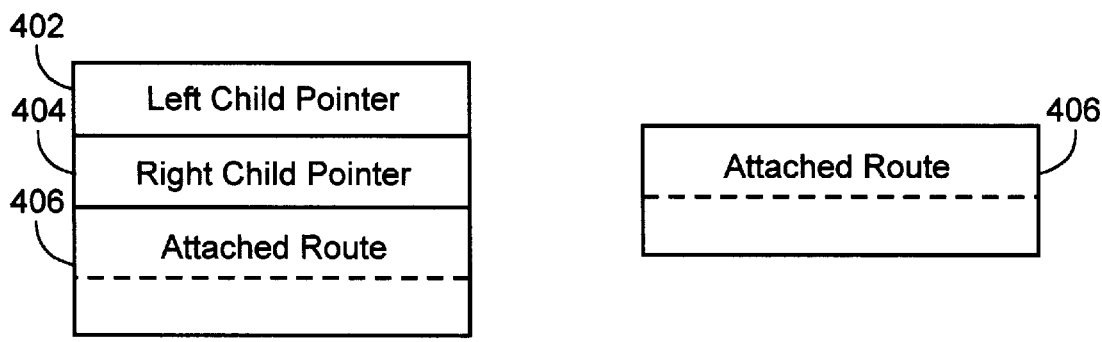
FIG. 4d is a schematic block diagram of a data structure for a internal node according to one embodiment of the present invention.

Internal nodes without routes attached have a data structure as shown in FIG. 4*d*. Specifically, no space is set aside for an attached route. Otherwise, the data structure is identical to that shown in FIG. 4*a*.

In a typical router implementation, a route table is not fully populated. That is, not all of the possible key values are mapped to a particular output port. Accordingly, some bits in the key are "don't care" values, and are not required to be tested during the route look-up process, because they do not affect the determination of the output port. In some prior art systems, the look-up of keys in the route table required the comparison of each bit in the key with entries in the route table. Such systems were inefficient. With a trie structure, not every bit in a key needs to be tested in order to determine the best match associated with a particular packet. By testing only the smallest number of bits that allow the discrimination between a key and existing routes, the speed of determining a match is improved.

Accordingly, for each key type, a route table is created in trie format. Referring now to FIG. 5, in a method of creating a trie, a start node is created for the trie (500). The start node is assigned an attached route (502). The left and right child pointers are assigned a null value (a binary 511 in one embodiment of the present invention) indicating that no left or right child exists (504). Finally, the four word start node including left child pointer (1), right child pointer (1) and attached route (2) is stored in memory 108 (506).

A check is made to determine if any other routes are needed to be placed in the trie (508). If not then, the process ends (510). Else, the next route is loaded (512). The first route in the trie is added as a route node (514). An associated route is assigned based on the destination for the particular prefix (516). The attached route and prefix information is stored in memory (518). Thereafter, the appropriate pointer in the start node (left child pointer or right child pointer) is updated based on the value of the zero bit of the first prefix (520). If the value of the zero bit in the first prefix (route) loaded is a "0", then the left child pointer is updated to reflect the starting address in memory where the route node for this prefix is stored. Alternatively, if the value of the zero bit in the first prefix loaded is a "1", then the right child pointer is updated to reflect the starting address in memory where the route node for this prefix is stored.

A check is made to determine if any other prefixes are needed to be placed in the trie (522). If so, the next prefix is loaded (523). The next prefix will be placed in the trie as either a route node, an internal node, an internal node with an attached route, or as an attached route to an existing internal node. A prefix search is performed in the existing trie (524). The search entails traversing the trie by testing the new prefix based on the bit indicated by the bit-to-test indicator for each node. At a given node, the bit in the new prefix designated by the bit-to-test indicator for the node is checked in order to determine the next node in the search. The prefix search continues until an end route is determined (526). An end route will be found either at a route node or at an internal node having an attached route. An end route is either the route associated with a route node or the first route located on the trie after the bit-to-test indicator associated with the current node on the trie exceeds the number of bits in the prefix being searched. The first route located may be an attached route to an internal node, or a route node. The search must terminate at a node which has an associated route in order to determine where (and how) the new prefix will be inserted into the trie.

That is, at the start node, the value of the zero bit is checked in the new prefix to determine if the search should proceed down a left child or the right child. At each subsequent node in the trie, the bit indicated by the bit-to-test indicator associated with the node is checked to determine a next node in the traversal. Eventually, the search will come to an end as described above. In our initial two node trie (start node and a route node), the search is diminimus, and may end at either the start node (if the new prefix being searched has a value in the zero bit different from the prefix associated with the route node) or at the route node.

At the end of the search, a comparison is made between the prefix being searched and the end route to determine the first dissimilar bit ($BIT_{Dis}$) in the new prefix (528). In one embodiment of the present invention, an EXCLUSIVE OR operation on the two prefixes is performed to reveal the first dissimilar bit. If a dissimilar bit is found, then branch A in the process is performed (529). If no dissimilar bits are found, then all of the bits of the new prefix match the end route and branch B in the process is performed.

In branch A, a dissimilar bit has been determined, and the new prefix will be inserted into the trie as route node pointed to by a new internal node which is to be inserted into the existing trie. Specifically, a new route node is created and stored in memory indicating the destination associated with the new prefix (530). Thereafter, a new internal node is created (532). The bit-to-test indicator for the new internal node is assigned to be the first dissimilar bit ($BIT_{Dis}$) discovered above (534). One of the child pointers (either the left child or the right child) of the new internal node is assigned the address of the new route node depending on the value of the bit-to-test indicator in the new prefix (536). Starting at the node associated with the end route identified above, the trie is traversed in reverse to locate the first node (the parent node) having a bit-to-test indicator which is less than the first dissimilar bit ($BIT_{Dis}$) (538). The node immediately beneath the parent node in the original trie is referred to as the grand-child node. The new internal node is inserted into the trie between the parent and the grand-child nodes by assigning the remaining child pointer in the new internal node the starting address associated with the grand-child node (540). Finally, the address of the pointer in the parent node which previously pointed to the grand-child node is updated to indicate the starting address in memory of the new internal node (542). Branch A is complete.

In branch B, no dissimilar bits were determined, necessitating a comparison of the length of the new prefix with the length of the end route (545). If the length of the new prefix is longer than the length of end route then branch B1 is traversed (546). If the length of the new prefix is shorter than the length of end route, then branch B2 will be traversed (547). Finally, if the length of the new prefix is the same as the length of end route, branch B3 will be traversed.

In branch B1 (the new prefix is longer than the length of end route), the new prefix will be inserted into the trie below the node associated with the end route as a new route node. Specifically, a new route node is created and stored in memory indicating the destination associated with the new prefix (550). Thereafter, a determination is made of the type of node associated with the end route (552). If the node associated with the end route is an internal node with an associated route, then the appropriate child pointer (based on the value of the bit in the new prefix of the bit-to-test indicator associated with the internal node) is assigned the starting address of the new route node (554). Else, a new internal node is created (556). The bit-to-test indicator for the new internal node is assigned to be the last bit in the end route (558). One of the child pointers (either the left child or the right child) of the new internal node is assigned the address of the new route node depending on the value of the bit in the new prefix of the bit-to-test indicator associated with the new internal node (560). Finally, the address of the pointer in the parent node (the node immediately preceding the route node associated with the end route and whose pointer previously indicated the starting address of the route node associated with the end route) is updated to indicate the starting address in memory of the new internal node (562). Branch B1 is complete.

In branch B2 the new prefix is shorter than the end route. The new prefix is inserted into the trie above the node associated with the end route, as either a new route or as an internal node with a route attached. Specifically, starting at the node associated with the end route, the trie is traversed backwards until a node (the parent node) is found having a bit-to-test indicator less than or equal to the index (length) of the new prefix (570). The node immediately beneath the parent node in the original trie is referred to as the grand-child node.

If the bit-to-test indicator is less than the index of the new prefix (571), then a new internal node is inserted below the parent node (572). The bit-to-test indicator for the new internal node is assigned the value of the index (length) of the new prefix (574). Accordingly, the new internal node tests the first bit after the end of the new prefix. The new internal node is inserted into the trie between the parent and the grand-child nodes by assigning one of the child pointers (as indicated by the value of the bit-to-test indicator of the new internal node) the starting address associated with the grand-child node (576). The other child pointer (either the left child or the right child) of the new internal node is assigned a null value (binary 511 in one embodiment)(578). Finally, the address of the pointer in the parent node which previously pointed to the grand-child node is updated to indicate the starting address in memory of the new internal node (580).

If the bit-to-test indicator of the node discovered in the backwards search is equal to the index of the new prefix, then the new prefix is inserted as an attached route for the node (590). Specifically, the attached route associated with the node determined in the search is updated to reflect the destination of the new prefix. Branch B2 is complete.

In branch B3 the new prefix is the same length as the end route. The new prefix is inserted into the trie as an update to the end route (592). Specifically, the route associated with the end node is updated to reflect the destination of the new prefix.

At the completion of branches A and B (and the various sub-branches of branch B including B1, B2 and B3), a check is performed to determine if any more prefixes need to be inserted into the trie (598). If so, then the process continues at step (523). Else, the process ends (510).

In one embodiment of the present invention, the process of constructing a trie is performed for each type of key based on an initial set of prefixes and associated destination information. In addition, each trie may be updated dynamically by a routing protocol associated with the controller 106 (FIG. 2). The routing protocol services the tries, and may insert new prefixes as necessary. The process for inserting a new prefix is identical to the process described above for inserting a next prefix after the first prefix in the trie has been installed as a route node (steps 522–592).

The updating process advantageously does not require the shutting down of the route look-up process. As was described above, the insertion of a route is accomplished off line, and only the final step in the process affects the trie. The final step in any insertion process requires writing in memory the address for a new node to the new node's parent. Accordingly, searches in a trie may be performed the entire time that an insertion process is operated to insert new entries or make changes to existing entries. The trie is never invalid, thus never requiring the shutting down of the look-up process for trie maintenance.

Figure 6A:
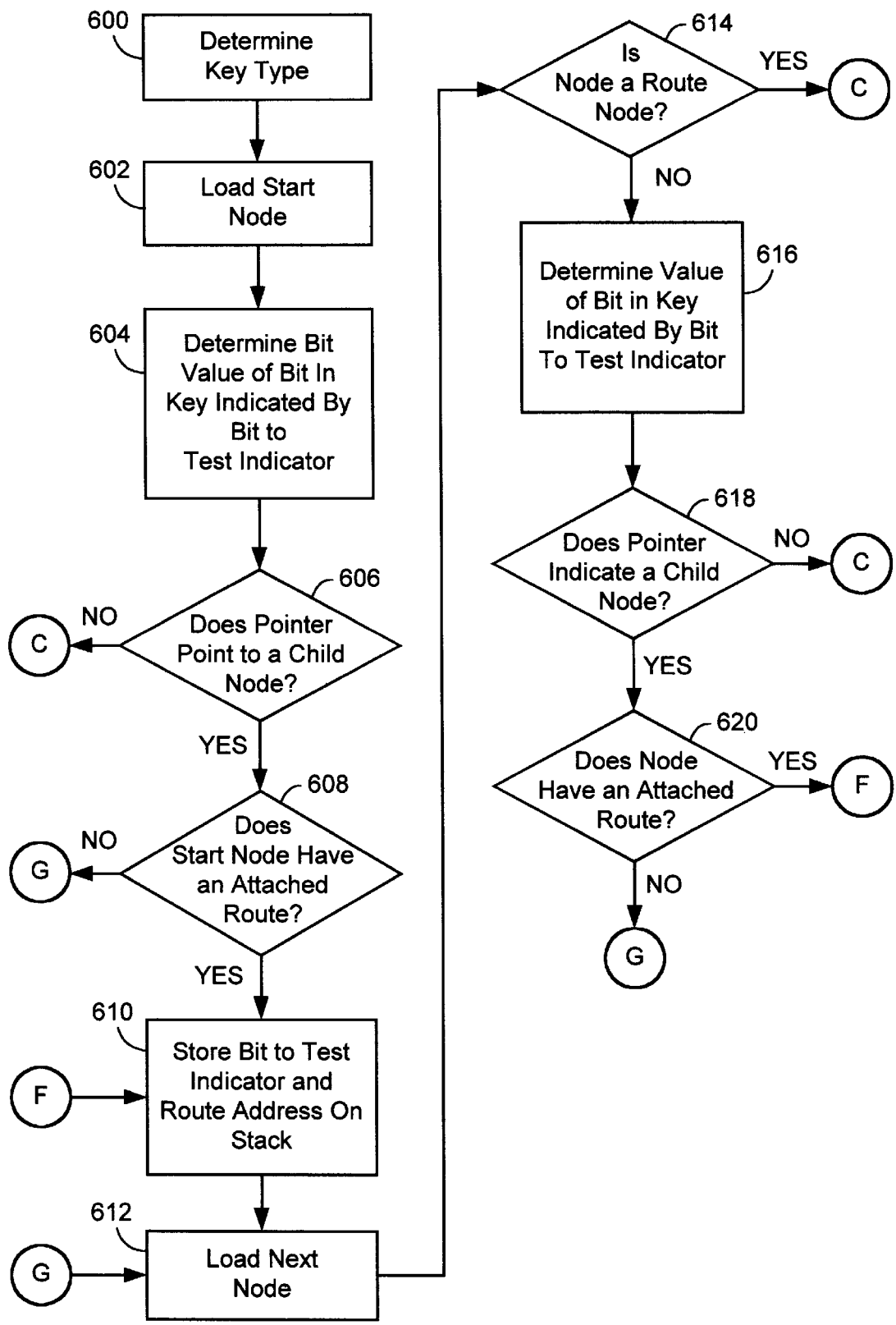
FIGS. 6a and 6b collectively are a process for routing data through the router according to one embodiment of the present invention.
Figure 6B:
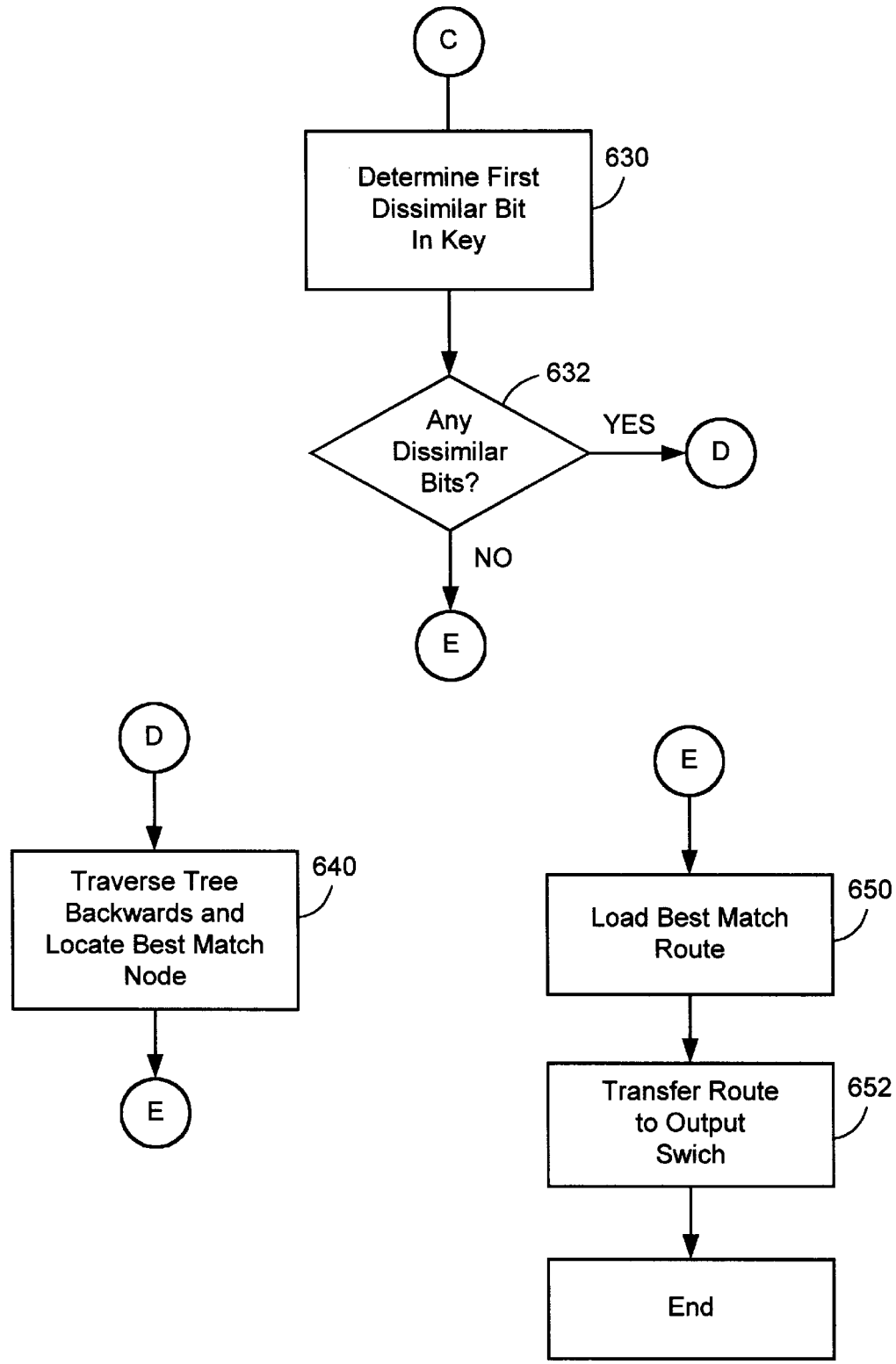

Having created a route table including one or more tries which are stored in memory as described above, the router is ready to process packets. A key is copied from an inbound packet by input switch 100 (FIG. 2) and transferred to route look-up engine 110 (FIG. 2) in the controller 106 (FIG. 2). Referring to FIGS. 2 and 6, in a best variable length match look-up method, a key type is determined for a new key to identify the particular trie that must be traversed in the look-up process (600). The look-up process includes a forward and backward traversal of the trie to determine the best match associated with a given key. The forward search begins at the start node. Specifically, the four word data block associated with the first node in the appropriate trie type is loaded into a buffer in the route look-up engine 110 from memory 108 (602). A bit test engine in route look-up engine 110 determines the value of the bit in the new key indicated by the bit-to-test indicator (as defined by the bit-to-test indicator field retrieved in step (602)) (604). Thereafter, the route look-up engine determines if the pointer indicated by the bit value (either the left child pointer or right child pointer) indicates a child node (606). If no child is indicated, then route look-up engine 110 performs a key comparison as is shown in branch C.

If the pointer indicates a child, then a check is made to determine if the start node has an attached route (608). If an attached route is associated with the start node, the route look-up engine stores the starting address in memory for the attached route (or the starting address associated with the contiguous memory locations associated with the start node) and the bit-to-test indicator associated therewith on a forward search stack in the route look-up engine (610). If no attached route exists, the process continues at branch G. The route look-up engine thereafter loads the data words associated with the next node indicated by the respective child pointer (612). For example, where the start node bit-to-test indicator is set to the "zero'th" bit, and if the zero'th bit in the new key location has a value of "0", then the route look-up engine will load the node indicated by the left child pointer. Alternatively, if the zero'th bit has a value of "1", the route look-up engine will load the node indicated by the right child pointer. In one embodiment of the present invention, the loading process of a node entails loading all of the data blocks associated with a given node (5 for internal nodes or 2 for route nodes). Alternatively, a lesser number of data words may be loaded as will be described below.

Thereafter the route look-up engine determines if the new node is a route node (614). If so, then a route has been determined and the process continues at branch C. If not, then the route look-up engine (bit comparison engine) determines the bit value in the new key of the bit indicated by the bit-to-test indicator associated with the new node (node loaded in step 612), where the bit-to-test is defined by the bit-to-test indicator field retrieved as part of the load in step 612 (616). Thereafter, the route look-up engine determines if the pointer indicated by the bit value (either the left child pointer or right child pointer) indicates a child node (618). If no child is indicated then the route look-up engine performs a key comparison as is shown in branch C.

Alternatively, the route look-up engine checks to determine if the new node has an attached route (620). If so, then the process continues at branch F resulting in the storage of the address associated with the attached route onto the stack (or the pointer indicating the starting address in memory for the attached route) prior to the loading of a next route. Alternatively, the process continues at branch G and the next node is loaded for processing. The route look up engine repeats this process for each node (steps 610–620) until an end node has been located.

An end node may be a route node or an internal node having an attached route. An internal node with an attached route will only be an end node if the value of the bit indicated by the bit-to-test indicator in the key being tested indicates a child pointer associated with the internal node that points nowhere (null). When an end node is reached, the route look-up engine performs branch C. Specifically, if the pointer indicated by a bit-to-test value in the new key points to a route, then the forward search portion of the process ends when the route is retrieved. If however, the pointer indicates a null, the search ends with the internal node.

Branch C can be characterized as follows: the forward search has terminated at an internal node (the end node) having a pointer to a left child or a pointer to a right child which has no data, and, this "no-data" pointer is indicated by the bit value in the new key of the bit-to-test bit of the end node; or, the search has terminated at a route node. The backward portion of the search begins by comparing the route associated with the current node (either an attached route for an internal node or a route associated with a route node) and the new key.

At this point, the best match for the new key will be at the end node or is guaranteed to be somewhere back-up stream (along the path from the end node back to the start node). Accordingly, in order to determine the best match, a key comparison engine in route look-up engine 110 compares the key being searched and the end route (the route associated with the end node) to determine the first dissimilar bit ($BIT_{Dis}$) in the new key (630). In one embodiment of the present invention, an EXCLUSIVE OR operation on the new key and prefix (route) is performed to reveal the first dissimilar bit. If a dissimilar bit is found, then branch D in the process is performed (632). If no dissimilar bits are found, then all of the bits of the new key match the end route and branch E in the process is performed.

In branch D, a dissimilar bit has been determined, and the end route is not a match for the new key. Starting at the end node, the trie is traversed in reverse to locate the first node (the best match node) having a bit-to-test indicator which is less than or equal to the bit number of the first dissimilar bit ($BIT_{Dis}$) (640). In one embodiment of the present invention, this is performed by popping off entries from the forward search stack in the route look-up engine (each entry associated with nodes that have attached routes and have been traversed as part of the forward search), until an entry is located which has a bit-to-test indicator value that is less than or equal to the bit number of the first dissimilar bit. When the best match node has been located, then the process continues at branch E.

In branch E, a best match route has been determined either by discovering no dissimilar bits when comparing the new key to the end route, or by traversing the trie and locating the route associated with the best match node. The route look-up engine loads the best match route from memory (650). In one embodiment, if the end route associated with the end node matches the new key, no load is required, such load having already been accomplished as part of the loading of the end node in the forward search of the trie. Alternatively, if the trie is required to be traversed backwards, the route information is loaded based on the pointer stored on the stack. The route look-up engine transfers the best match route information to the output switch 102 (FIG. 2)(652). Thereafter the process ends (654).

One of the advantages of the present invention is that the trie structure guarantees a best match for each key transmitted through the switch. As is described above, each route stored in the trie has a prefix associated therewith. A prefix is a left justified subset of a key. Accordingly, a key may match many prefixes in a trie. The best match is the matching prefix having the longest length. The system of the present invention provides for a best (longest) match for a key.

In addition, only a single key comparison is required in the entire matching process. The key is compared to a single prefix (at the end node) and thereafter the best match may be determined without performing any additional comparisons of the key to prefixes stored in the route look-up table.

ALTERNATIVE EMBODIMENTS

In one embodiment of the invention, numerous techniques are employed to speed the look-up process and minimize the number of memory accesses. Specifically, the following techniques are employed: minimized data word loads, multiple memory banks, spread data structures across memory banks and root table.

Minimized Data Word Loads

As was described above in conjunction with the forward traversal of a trie, a load operation is performed of the data words associated with each node in the forward search. This requires the loading of up to five words per node (bit-to-test indicator, left child pointer, right child pointer, and attached route (2 words)). Alternatively, lesser number of words may be loaded.

Specifically, in one embodiment of the invention, only the bit-to-test indicator and child pointers are loaded for a given node. In the event that the node is determined to be the end node in a forward search, then the attached route information can be loaded as required.

In another embodiment of the present invention, only the bit-to-test indicator is loaded initially for a given node. After the bit-to-test indicator is loaded for a given node, the bit value of the new key is used to determine which child should be loaded for this node, if any. For example, if the bit value of the bit in the new key indicated by the bit-to-test indicator is a "0", the left child only is loaded. If the bit value in the bit in the new key is a "1", then only the right child is loaded.

Figure 7A:
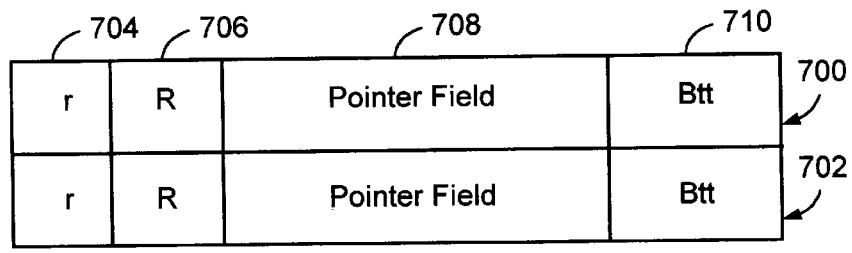
FIG. 7a is a schematic block diagram of a data structure for a internal node according to an alternative embodiment of the present invention.

In another embodiment of the present invention, an alternative data structure associated with the nodes is used to minimize memory accesses. Referring to FIG. 7a, a data structure for an internal node without an attached route is shown. Each internal node without an attached route includes a left child pointer 700, and a right child pointer 702. The left and right child pointers include two status bits 704 and 706 (little "r" and big "R", respectively), a pointer field 708 which points to the starting address of an associated child, and a bit-to-test indicator field 710 which indicates the bit-to-test in the child node indicated by the pointer field 708. The first status bit (little "r") 704 indicates whether the pointer stored in the pointer field 708 points to a route node or an internal node. The second status bit (big "R") 706 indicates whether an attached route exists for this node.

Figure 7B:
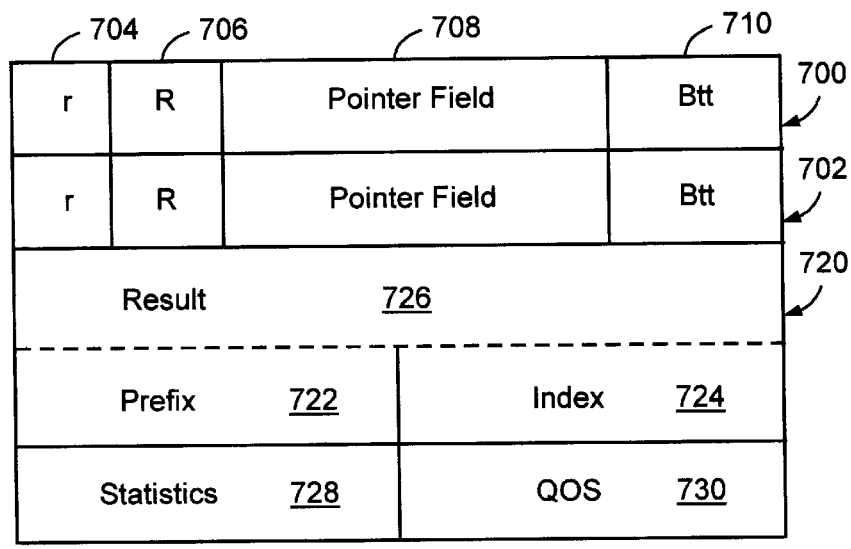
FIG. 7c is a schematic block diagram of a data structure for a route node according to an alternative embodiment of the present invention.

The data structure for an internal node with an attached route is shown in FIG. 7b. Each internal node with an attached route includes a left child pointer 700, a right child pointer 702 and an attached route 720. The left and right child pointers include two status bits 704 and 706 (little "r" and big "R", respectively), a pointer field 708 which points to the starting address of an associated child, and a bit-to-test indicator field 710 which indicates the bit-to-test in the child node indicated by the pointer field 708. The attached route 720 contains an index 722, a prefix 724, a result 726 (destination port), a statistics field 728 and quality of service field 730, the functions of which have been described above.

Figure 7C:
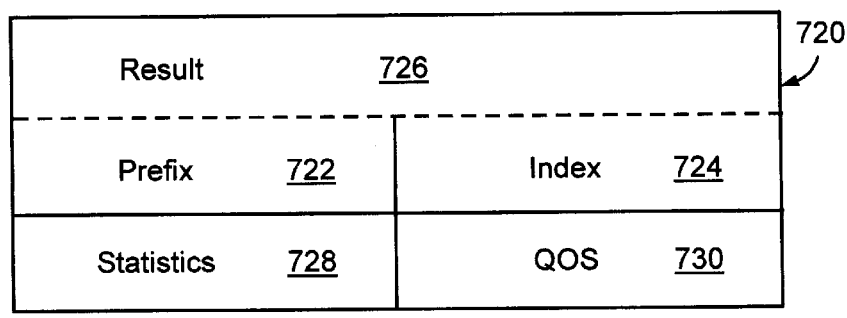

The data structure for a route node is shown in FIG. 7c. Each route node includes an attached route 720.

With this data structure, a single word per node is required to be loaded in order to traverse the trie. Only minor variations in the creation of the trie and in the traversal of the trie are required, yet the memory accesses required have been reduced substantially.

Figure 8A:
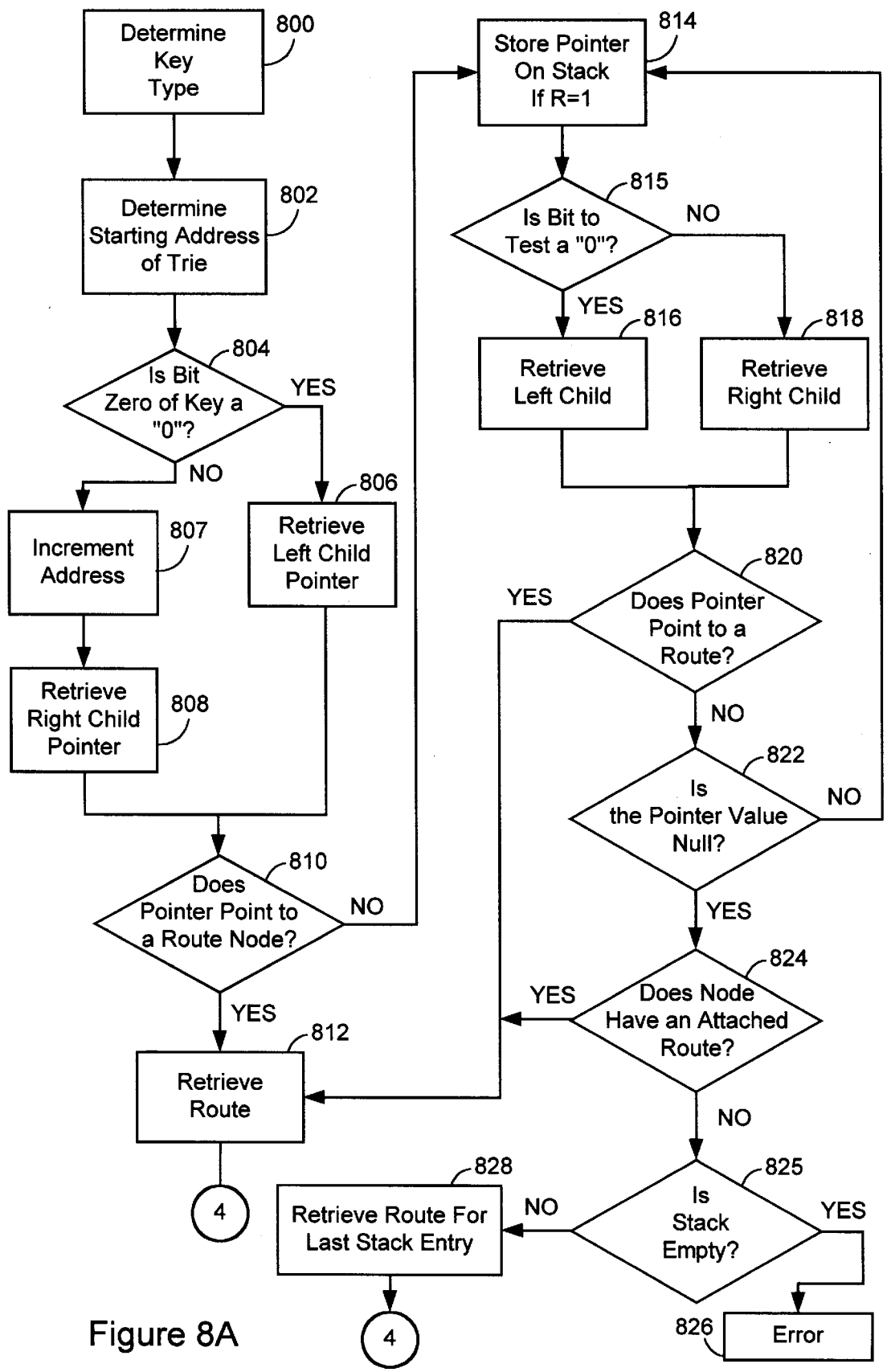
FIGS. 8a and 8b collectively are a process for routing data through the router according to an alternative embodiment of the present invention.
Figure 8B:
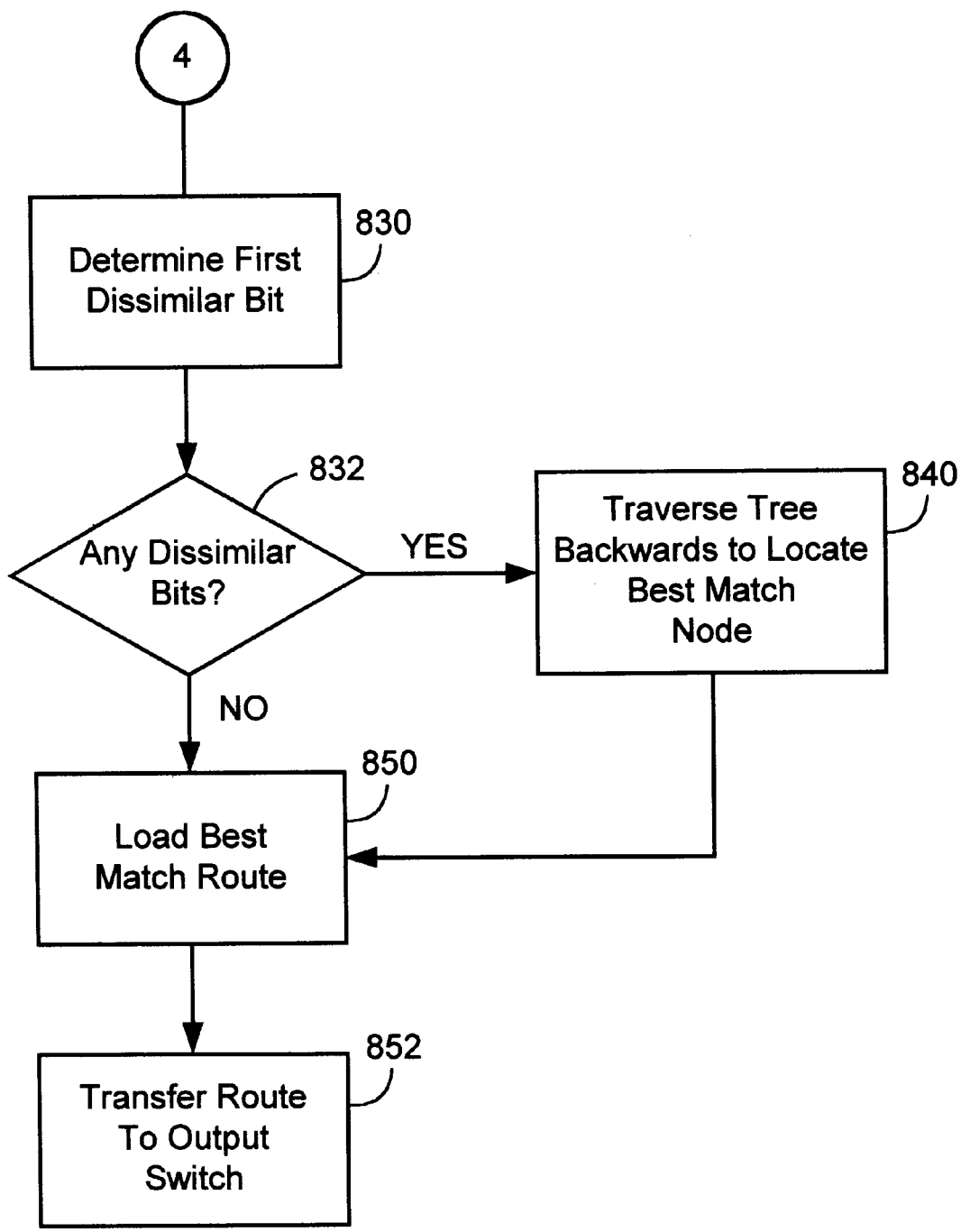

During the look-up operation, the benefits of the data structure proposed above are readily apparent. Referring to FIG. 8, the process of performing a best match variable length look-up of a route begins with determining the type of key for a new key received at the controller (800). The starting address of an appropriate start node is determined based on the trie type (802). Thereafter, a check is made of the value of the bit in the new key indicated by the bit-to-test indicator associated with the start node (typically bit zero) (804). If the value of bit in the new key is a "0", then the route look-up engine retrieves the left child pointer associated with the start node which will be located at the starting address determined above in step 802 (806). If the value of bit in the new key is a "1", the route look-up engine will increment by one the starting address received in step 802 (807) and retrieve the right child pointer associated with the start node (808).

A check is made to determine if the pointer retrieved points to a route (node) or to another internal node (810). If the pointer points to a route node (as indicated by the status of the little "r" status bit 704) then the route indicated by the pointer (the first left or right child pointer) is retrieved (812). If the pointer points to an internal node, then the route look-up engine will store the pointer retrieved on a stack if the "R"status bit is set (814). Specifically, the route look-up engine stores the bit-to-test indicator associated with the given node and the pointer retrieved in step 812. Thereafter, the route look-up engine (bit comparison engine) will test the bit of the new key indicated by the bit-to-test indicator field in the pointer retrieved in steps 806 or 808.

If the bit indicated by the bit-to-test indicator has a value of "0" in the new key, then the route look-up engine will retrieve the left child associated with the address indicated by the pointer (816). Specifically, the route look-up engine will retrieve the data word which is indicated by the address indicated by the left or right child pointer.

If the bit (in step 812) has a value of "1" in the new key, then the route look-up engine will retrieve the right child associated with the address indicated by the pointer (818). Specifically, the route look-up engine will retrieve the data word which is indicated by the address indicated by the child pointer incremented by one.

This process repeats (steps 814–822) until an end route is located. Specifically, if the pointer indicated by a bit-to-test value in the new key points to a route (820), then the forward search portion of the process ends when the route is retrieved (812). If however, the pointer retrieved indicates a null value (822), a check is made to determine if the node has an attached route (824). If so, then the forward search portion of the process ends and the associated internal route is retrieved in step 812. If no attached route exists, a check is made to determine if the stack is empty (825). If so, an error condition occurs and the route look-up terminates (826). If the stack is not empty, then the last entry on the stack is retrieved (828) and the process continues at step 830. The route retrieved from the route node, the internal node with attached route, or the route indicated by the stack entry will become the end route for the purposes of performing the backward portion of the look-up process.

In order to determine the best match, the route look-up engine (key comparison engine) compares the key being searched and the end route to determine the first dissimilar bit ($BIT_{Dis}$) in the new key (830). If a dissimilar bit is found (832), then starting at the end node, the trie is traversed in reverse to locate the first node (the best match node) having a bit-to-test indicator stored on the stack which is less than or equal to the bit number of the first dissimilar bit ($BIT_{Dis}$) (840). In one embodiment of the present invention, this is performed by popping off entries from the forward search stack in the route look-up engine, each entry associated with nodes that have been traversed as part of the forward search, until a entry is located which has a bit-to-test indicator value that is less than or equal to the bit number of the first dissimilar bit.

If no dissimilar bits are found or if the best match node has been determined in step 840, then the route look-up engine loads the best match route, either the route associated with the best match node or the end route from memory (850). If the best match route is the end route, no memory load is required, such load having been accomplished as part of the comparison above. Alternatively, the route information is loaded by incrementing the memory address retrieved from the stack node by two(if the starting address for the node is stored on the stack as opposed to the address for the attached route), and loading the appropriate route information. Thereafter, the route look-up engine transfers the best match route to the output switch 102 (852).

Mulyiple Memory Banks

Referring again to FIG. 2, in one embodiment of the invention, the memory 108 attached to controller 106 is a bank of four static RAMs (SRAMs). In the construction of the route table, parents and children are distributed among the SRAM banks such that no parent and child are stored in the same bank of static RAM. Accordingly, when a route look-up engine accesses a particular memory location in memory 108, it is guaranteed to not to have to access the same memory bank in order to traverse to the next node in a given path. The use of multiple memory banks is useful to increase the number of simultaneous read operations which can be performed in the look-up process. Distribution of parent and children nodes across the memory banks helps to avoid bank conflicts.

Spread Data Structures across Memory Banks

Figure 4D:
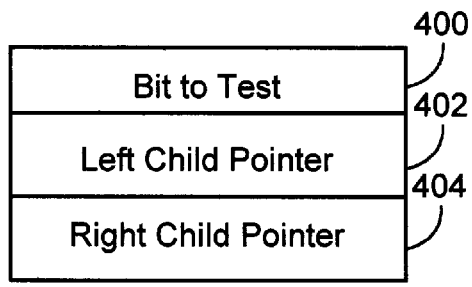
Figure 5A:
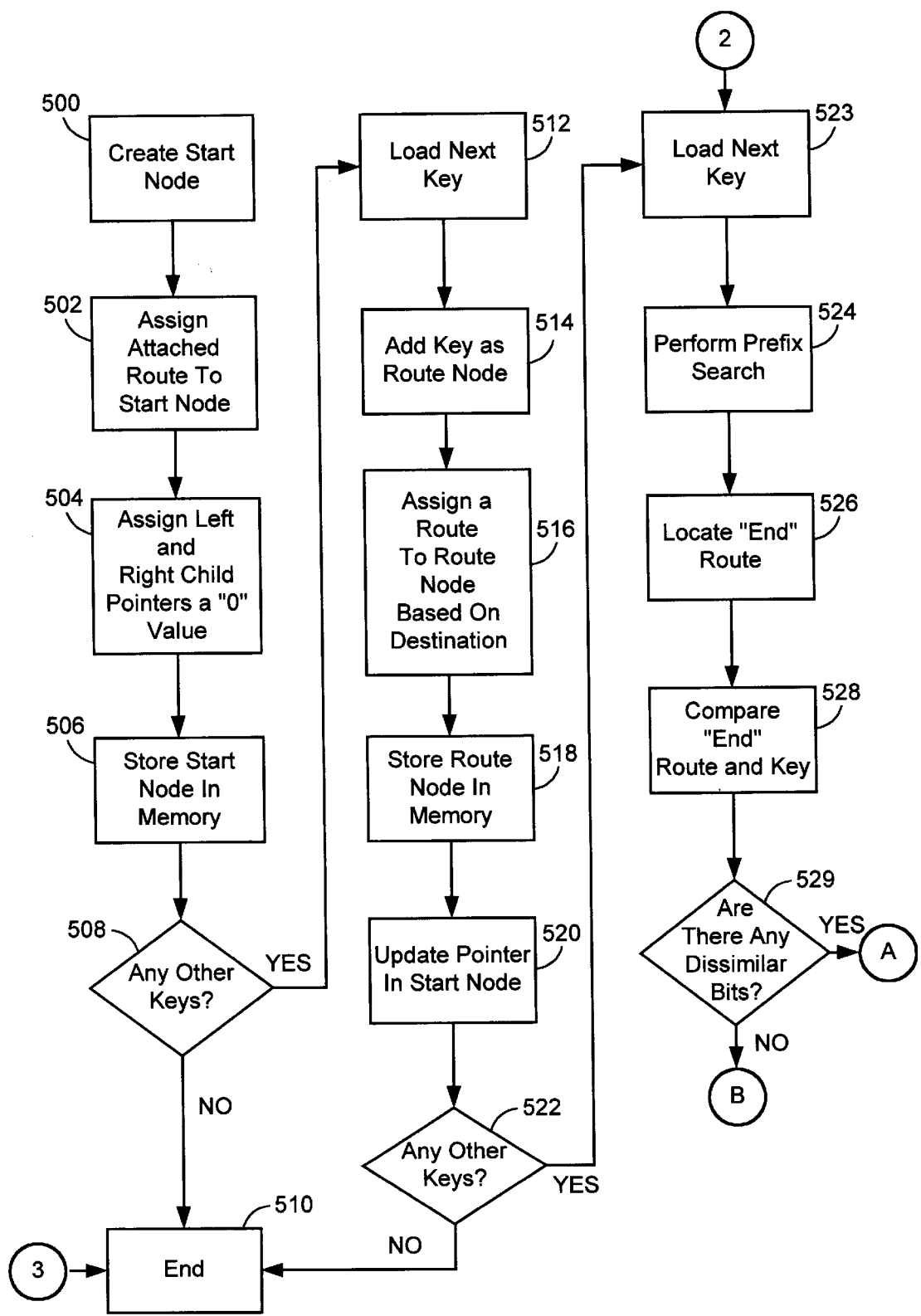
FIGS. 5a–5g collectively are a flow chart for a populating a trie according to one embodiment of the present invention.
Figure 5B:
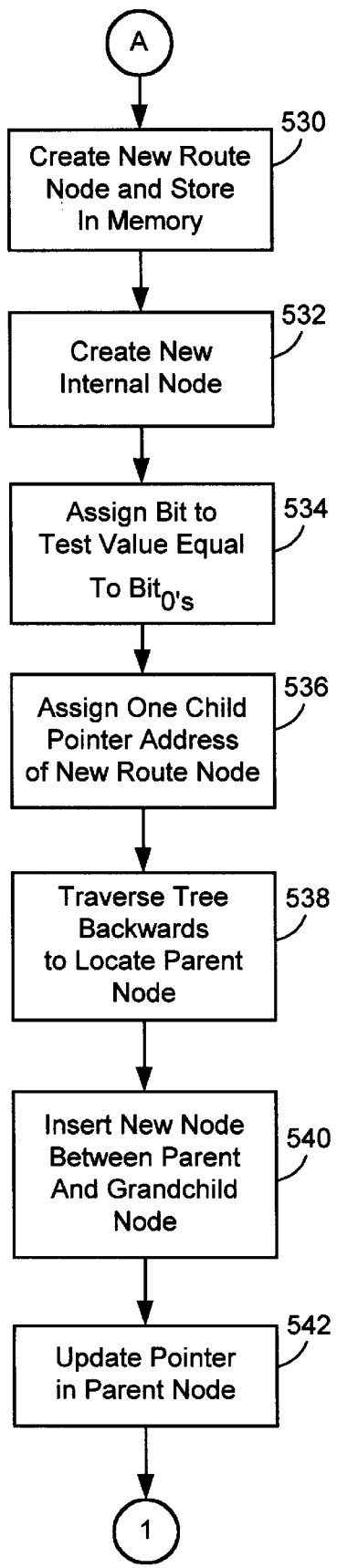
Figure 5C:
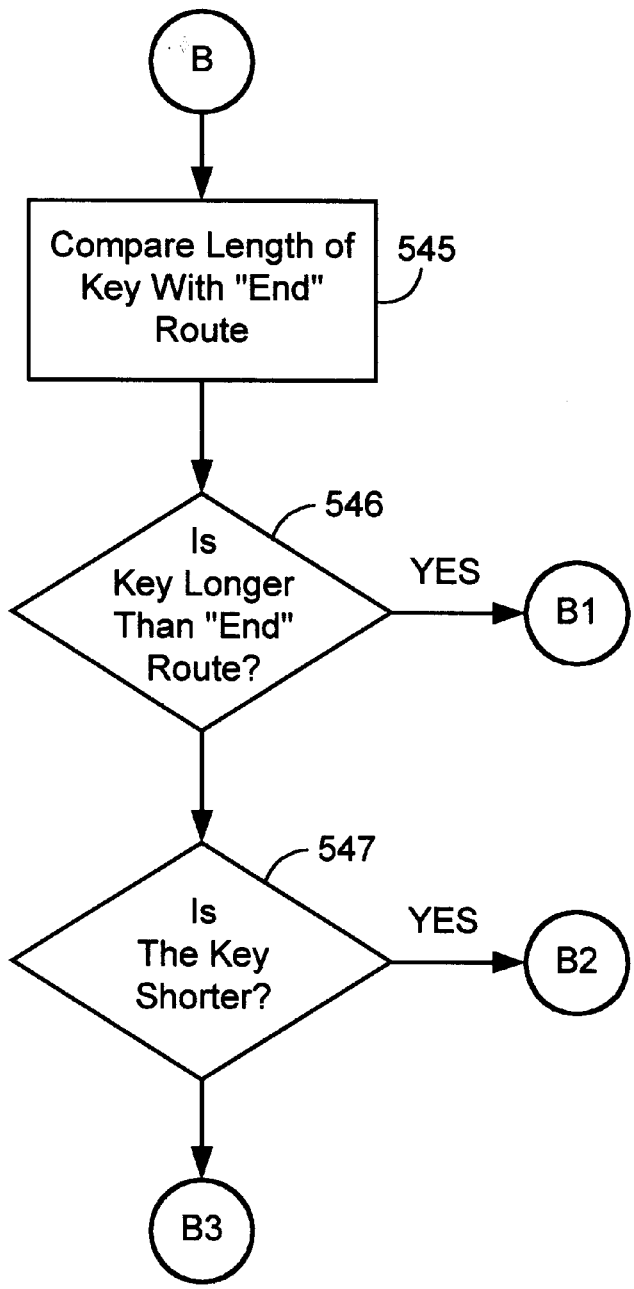
Figure 5D:
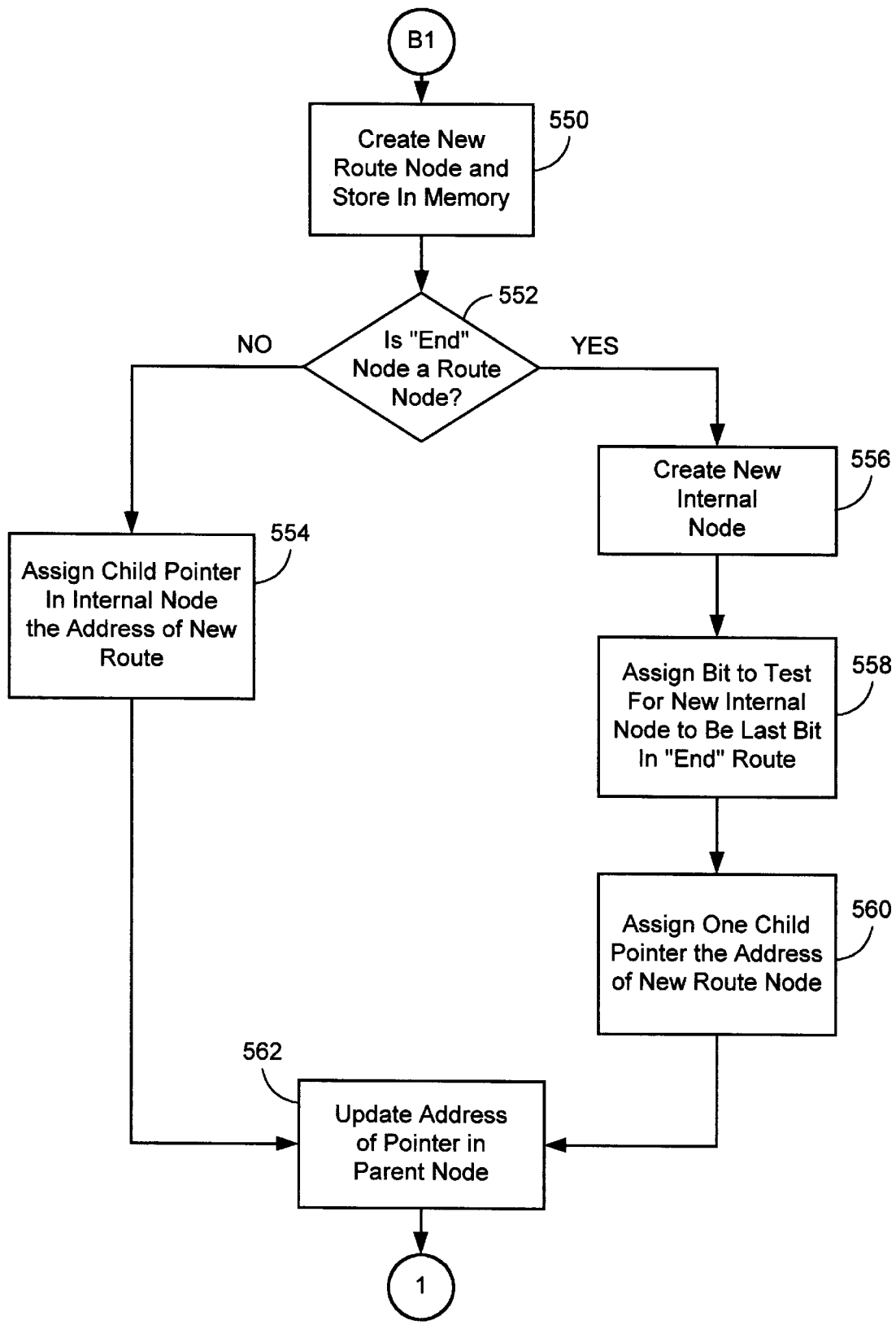
Figure 5E:
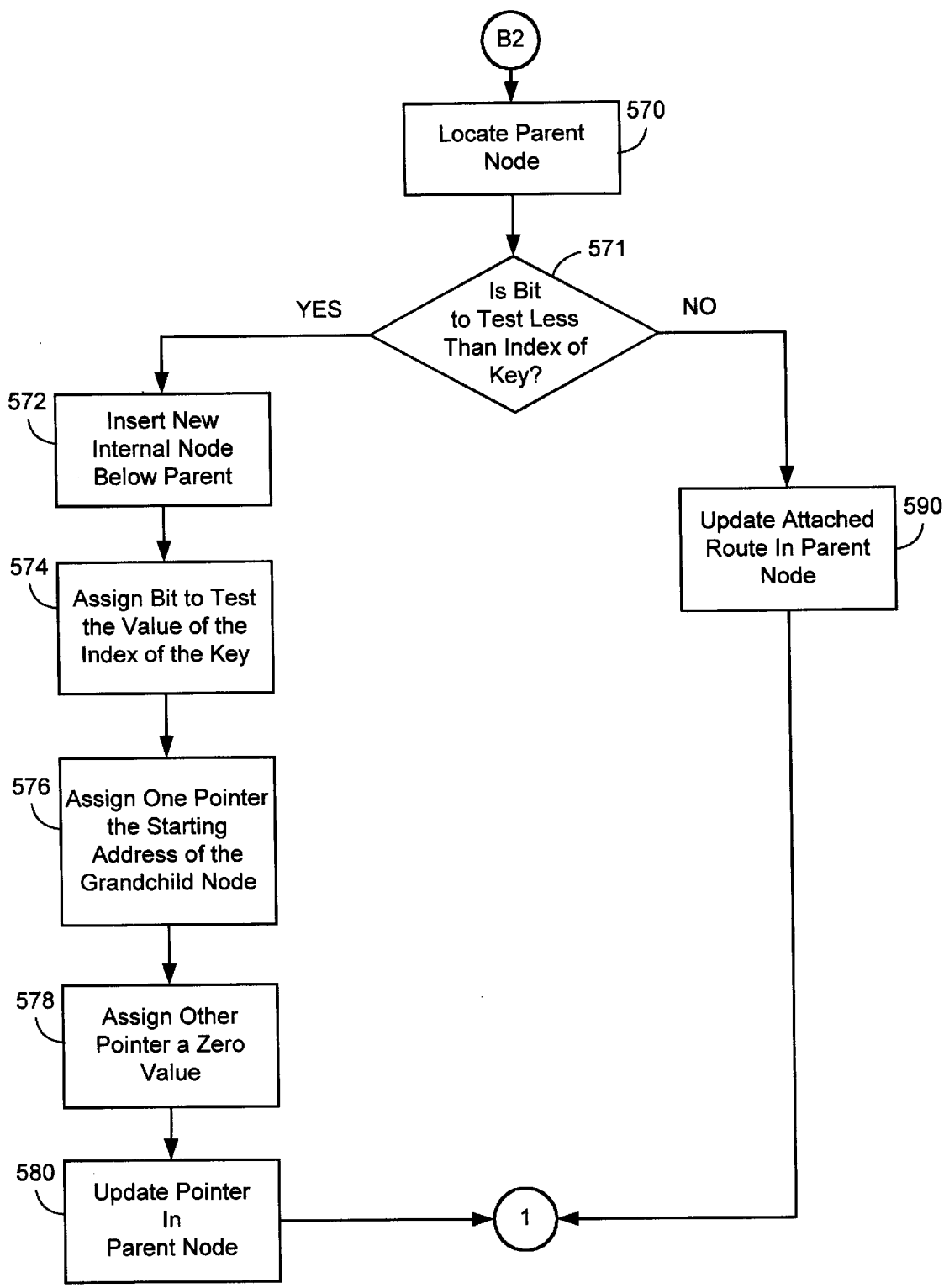
Figure 5F:
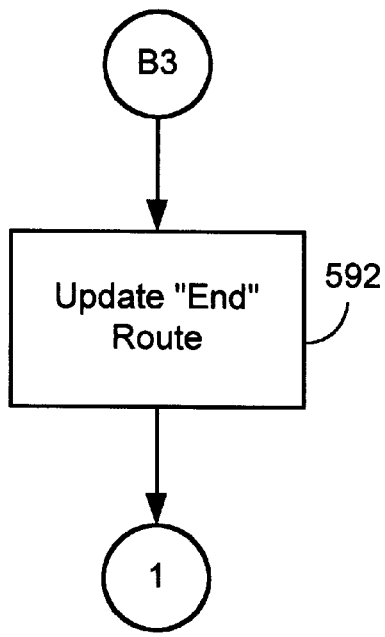
Figure 5G:
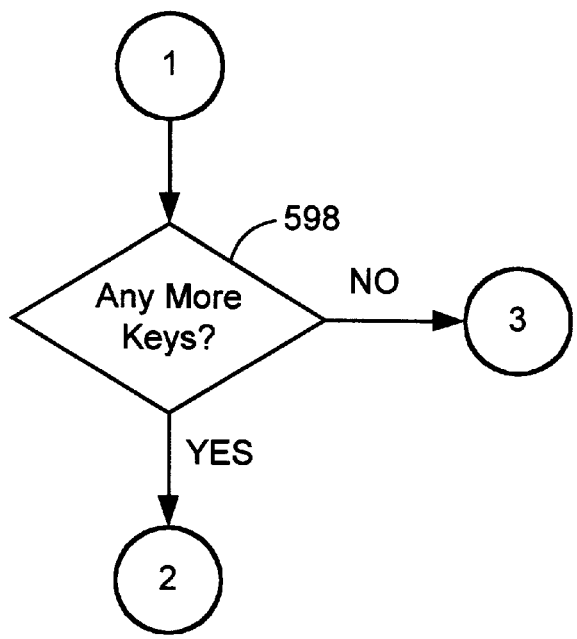

Another memory saving technique included in one embodiment of the present invention is the attachment of routes sequentially in memory for a given node. As was described above in reference to the node data structures as described in reference to FIGS. 4 and 7, if an internal node has an attached route, then the route is placed by design immediately following the associated right child pointer in memory. Accordingly, when the best match is located for a given node, the destination information associated therewith is known precisely, and may be retrieved directly from memory (as opposed to indirect retrieval if a pointer system is used). This organization technique saves on memory accesses.

For example, upon a match condition, the route look-up engine must load the result which includes the output port associated with the particular switch. With the memory structure described above, the result may be loaded directly by incrementing the pointer information popped off the stack during the backward traversal of the trie (by adding 2 or 3 address locations to the stack pointers depending on the type of node).

Root Table

In one embodiment of the present invention, a root table is used as a preliminary screen for matching the most significant bits in a key. A root table may be used to perform a quick match of the most significant bits in a key so as to avoid having to perform many memory accesses in the trie search. The root table is stored in controller 106 (FIG. 2). Each entry in the route table includes an address to the start node in memory at which the look-up is to begin and a stack entry. The stack entry includes a bit-to-test indicator and a pointer to an attached route. The table is indexed according to the first N bits of the key. In one embodiment of the present invention, the first eight bits of the key are indexed.

The present invention has been described in terms of specific embodiments, which are illustrative of the invention and not to be construed as limiting. Other embodiments are within the scope of the following claims.

What is claimed is:

1. A method of looking up a key associated with a packet to determine a route through a routing device comprising:

upon receipt of the key, forward traversing one or more nodes which make up a tree stored in a memory by evaluating at each node traversed a bit in the key as indicated by a bit-to-test indicator associated with each node, a value of the bit in the key determining a path traversed along the tree;

locating an end node in the tree, the end node having a route;

comparing the route to the key;

if they match, outputting destination information associated with the end node to guide the transfer of the packet through the routing device; and if they do not match, traversing the tree backwards to locate a best match for the key.

2. The method of claim 1 wherein the step of forward traversing includes storing on a stack for each node having an attached route the bit-to-test indicator and a pointer to the attached route.

3. The method of claim 2 wherein the step of traversing the tree backwards includes:

comparing the key with the route to determine a first dissimilar bit location;

popping entries off the stack to determine when the bit-to-test indicator associated with a first node in the backward traversal is less than or equal to the first dissimilar bit location; and outputting destination information associated with the first node to guide the transfer of the packet through the routing device.

4. The method of claim 3 wherein the first node includes a route, the method further including calculating statistical information for each packet and storing in memory the statistical information with the route associated with each of the end node and the first node.

5. The method of claim 4 further including transferring the statistical information along with the destination information to an output port in the routing device for transfer to a destination.

6. The method of claim 1 further including the step of prior to a forward traversal of the tree, searching a root table for a match of a predetermined number of bits in the key, the root table indexed by the predetermined number of bits where each entry includes a pointer to a start node in the tree to begin the forward traversal.

7. The method of claim 1 wherein the forward traversal of the tree includes loading node information for each node traversed in the tree until the end node is reached, the node information including a bit-to-test indicator, a left child pointer, a right child pointer and an attached route.

8. The method of claim 1 where the nodes in the tree include left child pointers and right child pointers, each pointer including a bit-to-test indicator and an address in the memory where the child node is stored, the bit-to-test indicator indicating a bit to be tested in the key associated with a child node to which the left or right child pointer indicates, and where the forward traversal includes testing a bit indicated by the bit-to-test indicator associated with a child pointer and retrieving an appropriate child pointer associated with the child node that indicates a next node in the tree to be traversed after the child node, whereby accesses to the memory are minimized in the forward traversal of the tree by loading a single pointer at each node until the end node is reached.

9. A method of routing a packet through a switch comprising:

upon receipt of the packet, extracting a key from the packet;

forward traversing a tree by evaluating at each node a bit in the key as indicated by a bit-to-test indicator associated with each node, a value of the bit in the key located at a position indicated by the bit-to-test indicator determining a path traversed along the tree at each node;

locating an end node in the tree, the end node having a route;

comparing the route to the key;

if they match, retrieving destination information associated with the end node;

if they do not match, traversing the tree backwards to locate a best match for the key having a route and destination information associated therewith; and routing the packet through the switch according to the destination information.

10. The method of claim 9 further including calculating statistical information associated with each route and storing the statistical information in memory with an associated route.

11. The method of claim 10 wherein the statistical information is forwarded along with the packet to a destination.

12. The method of claim 10 wherein the statistical information includes transaction statistics associated with numbers or types of packets routed to a particular destination.

13. The method of claim 10 wherein the statistical information includes billing information.

14. The method of claim 9 further including assigning quality of service information to each route, the quality of service information determining a priority of a transfer of the packet out of the routing device.

15. A method of inserting a route in a route table where the route table is stored as a tree in a memory of a routing device, the route table defining a path by which a packet is transferred through the routing device, the method comprising:

traversing the tree to determine an insertion point;

creating a new node;

determining if the insertion point for the new node is between existing nodes in the tree;

if so, setting a child pointer in the new node to indicate a node directly beneath the insertion point;

storing the new node in the memory; and updating the child pointer in a node directly above the insertion point to indicate a starting address in the memory for the new node.

16. A router for routing packets in a packet switched network comprising:

one or more input ports for receiving packets;

a packet memory;

an input switch coupled to each input port and the memory, the input switch including a transfer engine for transferring packets from an input port to the packet memory and a key extraction engine for extracting a key from each packet;

a controller coupled to the input switch, the controller including a key look-up engine and a route memory, the route memory for storing a route table where the route table includes a tree, the key look-up engine traversing the tree to determine a best match to the key, and upon determining the best match for the key, generating notification information;

one or more output ports;

an output switch coupled to the controller, the packet memory and the output port for transferring packets from packet memory to an appropriate output port based on the notification information received from the controller.

17. The apparatus of claim 16 where the key look-up engine includes a forward traversal engine for forward traversing the tree including evaluating at each node traversed a bit in the key as indicated by a bit-to-test indicator associated with each node, where a value of the bit in the key determines the path traversed along the tree, locating an end node having a route, comparing the route to the key, if they match, outputting destination information associated with the end node to guide transfer of a packet through the routing device, and if they do not match, traversing the tree backwards to locate a best match for the key.

18. The apparatus of claim 17 further including a stack and where the forward traversal engine stores on the stack a bit-to-test indicator for the node and a pointer to the attached route for each node having an attached route.

19. The apparatus of claim 18 where the key look-up engine includes a backward traversal engine for comparing the key with the route to determine a first dissimilar bit location, popping entries off the stack to determine when a bit-to-test indicator associated with a first node in the backward traversal is less than or equal to the first dissimilar bit location, and outputting destination information associated with the first node to guide a transfer of a packet through the router.

20. The apparatus of claim 16 further including a statistical engine for calculating statistical information for each data packet and outputting the statistical information with destination information for transfer to a destination port.

21. The apparatus of claim 16 where the route memory is divided into a plurality of banks, and where parent and children nodes in the tree are stored in different banks.

22. The apparatus of claim 16 where each node in the tree includes a bit-to-test indicator, a left child pointer, a right child pointer and an attached route, the left child pointer indicating a child node to be traversed in the forward traversal when a value of a bit in the key as indicated by the bit-to-test indicator is a first value, the right child pointer indicating a child node to be traversed in the forward traversal when a value of a bit in the key indicated by the bit-to-test indicator is a second value.

23. The apparatus of claim 22 where the left child pointer, right child pointer and attached route are stored in contiguous locations in the route memory.

24. A route look-up engine for locating a best match for a key in a route table, the route table including a tree stored in a memory associated with a routing device, the tree including one or more entries defining a path through a routing device for transferring a packet in a packet switched network from a source to a destination, the route look-up engine comprising:

a stack for storing stack entries including a bit-to-test indicator and a pointer to the destination; and a look-up engine including a buffer, a bit comparison engine and a key comparison engine, the buffer for storing node information that is retrieved from the memory, the node information including a bit-to-test indicator, wherein responsive to receiving the key associated with a packet, the look-up engine forward traverses the tree, the bit comparison engine evaluating at each node traversed a bit in the key as indicated by a bit-to-test indicator associated with each node, a value of the bit in the key determining the path traversed along the tree, the look-up engine storing stack entries on the stack for each node traversed having an attached route, the look-up engine locating an end node having a route, the key comparison engine performing a singular key comparison for each packet routed through the routing device by comparing the key with the route, if they match, the look-up engine outputting destination information associated with the end node to guide the transfer of the packet through the routing device and if they do not match, the look-up engine traverses the tree backwards popping entries off the stack to locate a best match for the key and destination information associated therewith.

25. A computer program, tangibly stored on a computer-readable medium, comprising instructions for causing a computer to:

upon receipt of a key, forward traverse a tree stored in a memory by evaluating at each node traversed a bit in the key as indicated by a bit-to-test indicator associated with each node, a value of the bit in the key determining a path traversed along the tree;

locate an end node in the tree, the end node having a route;

compare the route to the key;

if they match, output destination information associated with the end node to guide a transfer of a packet through a routing device; and if they do not match, traverse the tree backwards to locate a best match for the key and destination information associated therewith.

26. The computer program of claim 25 wherein the forward traverse includes instructions to cause the computer to:

store on a stack for each node having an attached route the bit-to-test indicator for the node and a pointer to the attached route.

27. The computer program of claim 25 wherein the backward traverse includes instructions to cause the computer to:

compare the key with the route to determine a first dissimilar bit location;

pop entries off the stack to determine when the bit-to-test indicator associated with a first node in the backward traversal is less than or equal to the first dissimilar bit location; and output destination information associated with the first node to guide a transfer of the packet through the routing device.

28. The method of claim 1 wherein the tree is a modified radix trie.

29. The method of claim 1 where the nodes in the modified radix trie include left child pointers and right child pointers, each pointer including a bit-to-test indicator and an address in the memory where the child node is stored, the bit-to-test indicator indicating a bit to be tested in the key associated with a child node to which the left or right child pointer indicates, and where the forward traversal includes testing a bit indicated by the bit-to-test indicator associated with a child pointer and retrieving an appropriate child pointer associated with the child node that indicates a next node in the tree to be traversed after the child node, whereby accesses to the memory are minimized in the forward traversal of the modified radix trie by loading a single pointer at each node until the end node is reached.

* * * * *